US011322763B2

(12) United States Patent
Poirier et al.

(10) Patent No.: US 11,322,763 B2
(45) Date of Patent: May 3, 2022

(54) AIRCRAFT FUEL CELLS SYSTEM

(71) Applicants: Airbus SAS, Blagnac (FR); Airbus Operations SAS, Toulouse (FR); Airbus Operations GmbH, Hamburg (DE)

(72) Inventors: Didier Poirier, Blagnac (FR); Guido Klewer, Hamburg (DE); Anthony Roux, Toulouse (FR); Olivier Raspati, Toulouse (FR); Matthieu Thomas, Toulouse (FR); Olivier Verseux, Toulouse (FR); Manuel Silvestre Salas, Taufkirchen (DE)

(73) Assignees: AIRBUS SAS, Blagnac (FR); AIRBUS OPERATIONS SAS, Toulouse (FR); AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/026,519

(22) Filed: Sep. 21, 2020

(65) Prior Publication Data

US 2021/0098805 A1    Apr. 1, 2021

(30) Foreign Application Priority Data

Sep. 27, 2019    (FR) ...................................... 1910692

(51) Int. Cl.
*H01M 8/04746*    (2016.01)
*H01M 8/04029*    (2016.01)
(Continued)

(52) U.S. Cl.
CPC ... *H01M 8/04768* (2013.01); *H01M 8/04029* (2013.01); *H01M 8/04074* (2013.01);
(Continued)

(58) Field of Classification Search
CPC ......... H01M 8/04768; H01M 8/04029; H01M 8/04723; H01M 8/249; H01M 8/04201;
(Continued)

(56) References Cited

U.S. PATENT DOCUMENTS

2004/0185319 A1* 9/2004 Enjoji ............... H01M 8/04768
429/432
2007/0178347 A1* 8/2007 Siepierski ......... H01M 8/04089
429/441
(Continued)

FOREIGN PATENT DOCUMENTS

DE    102016115789 A1    3/2018
EP        3352273 A1    7/2018

OTHER PUBLICATIONS

French Search Report; priority document.

*Primary Examiner* — Matthew W Van Oudenaren
(74) *Attorney, Agent, or Firm* — Greer, Burns & Crain, Ltd.

(57) ABSTRACT

A system of fuel cells for an aircraft includes a plurality of fuel cells, a hydrogen circuit, an air circuit, and a first cooling circuit configured to cool a first subset of cells including at least two cells. The first cooling circuit includes a computer-controlled device for mixing a first liquid coolant at a first temperature with a second liquid coolant at a second temperature lower than the first temperature to obtain a liquid coolant having a target temperature, a liquid coolant restrictor configured to distribute the liquid coolant between the cells of the first subset, and an outlet valve, the opening of which is controlled by the computer as a function of the cooling needs of the cells of the first subset. The use of a cooling circuit to cool several fuel circuits makes it possible to limit the bulk of the fuel cells system.

8 Claims, 3 Drawing Sheets

(51) Int. Cl.
  *H01M 8/0438* (2016.01)
  *H01M 8/04007* (2016.01)
  *H01M 8/0432* (2016.01)
  *H01M 8/04701* (2016.01)

(52) U.S. Cl.
  CPC .... *H01M 8/04358* (2013.01); *H01M 8/04417* (2013.01); *H01M 8/04723* (2013.01); *H01M 2250/20* (2013.01)

(58) Field of Classification Search
  CPC ......... H01M 8/04074; H01M 8/04253; H01M 8/04358; H01M 8/04417; H01M 2250/20
  See application file for complete search history.

(56) References Cited

U.S. PATENT DOCUMENTS

| | | | |
|---|---|---|---|
| 2007/0248861 A1* | 10/2007 | Hoshi | H01M 16/006 429/435 |
| 2009/0035613 A1 | 2/2009 | Chikugo et al. | |
| 2010/0049038 A1 | 2/2010 | Florent et al. | |
| 2015/0017557 A1* | 1/2015 | Hoffjann | H01M 8/0662 429/410 |
| 2018/0198139 A1 | 7/2018 | Ikoma | |

* cited by examiner

AIRCRAFT FUEL CELLS SYSTEM

CROSS-REFERENCES TO RELATED APPLICATIONS

This application claims the benefit of the French patent application No. 1910692 filed on Sep. 27, 2019, the entire disclosures of which are incorporated herein by way of reference.

FIELD OF THE INVENTION

The present invention relates to a system of fuel cells in an aircraft, said system comprising a plurality of fuel cells.

BACKGROUND OF THE INVENTION

A fuel cells system is able to generate electricity without emitting any emissions that are harmful to the environment. Such a system of cells is able to supply electrical power to multiple items of equipment on board an aircraft, e.g., the lighting, the ventilation, the aircraft propulsion system, etc.

For example, it is known practice to use a propulsion system comprising at least one fuel cell used to supply power to an electric motor and a propeller. Such a propulsion system generally comprises a plurality of fuel cells.

It is also known practice to associate with each fuel cell a collection of auxiliary equipment items ("BOP" which stands for "Balance of Plant") that allow the cells to operate. Each set of balance of plant equipment notably comprises an air circuit configured to supply the fuel cell with dioxygen, a hydrogen circuit configured to supply the fuel cell with dihydrogen and a cooling circuit.

Such sets of balance of plant equipment are bulky and cumbersome.

It is therefore desirable to alleviate these disadvantages of the prior art.

SUMMARY OF THE INVENTION

A system of fuel cells for an aircraft is described. The system comprises:
a plurality of fuel cells,
a hydrogen circuit and an air circuit which carry hydrogen and air, respectively, towards the fuel cells, and
a first cooling circuit configured to cool a first subset of fuel cells of the plurality of fuel cells. The first subset comprises at least two fuel cells. The first cooling circuit comprises:
a computer-controlled device for mixing a first portion of a liquid coolant at a first temperature with a second portion of the liquid coolant at a second temperature lower than the first temperature so as to obtain a liquid coolant having a target temperature, the outlet of the device being connected to the inlet of the fuel cells of the first subset;
a liquid coolant restrictor at the inlet to each of the fuel cells of the first subset and configured to distribute the liquid coolant at the target temperature between the fuel cells of the first subset; and
an outlet valve connected to the outlet of the fuel cells of the first subset, the opening of the outlet valve being controlled by the computer as a function of the cooling needs of the fuel cells of the first subset.

According to one embodiment, the system also comprises a heat exchanger configured to cool a part of the liquid coolant leaving the first cooling circuit, a bypass valve configured to mix a part of the liquid coolant leaving the first cooling circuit and the part of the liquid coolant cooled by the heat exchanger and a pump connected to an outlet of the bypass valve, the pump being controlled by the computer to control the flow rate of liquid coolant circulating in the first cooling circuit so as to regulate the temperature of the liquid coolant at the outlet of the fuel cells.

According to one embodiment, the system further comprises a storage tank of hydrogen in liquid form and a capsule in contact with the tank in which circulates a part of the liquid coolant leaving the pump, the capsule being configured to vaporize the liquid hydrogen from the part of the liquid coolant.

According to one embodiment, the system comprises a second cooling circuit similar to the first cooling circuit and configured to cool a second subset of at least two cells of the plurality of fuel cells, the second subset being distinct from the first subset.

According to one embodiment, the first and second cooling circuits are connected to the heat exchanger in parallel.

According to one embodiment, the pump being configured to control the flow rate of liquid coolant circulating in the first and second cooling circuits, the pump is servocontrolled by the cooling circuit out of the first and second cooling circuits associated with the fuel cells that have the highest cooling needs.

According to one embodiment, the first cooling circuit is configured to cool all of the plurality of fuel cells.

According to one embodiment, the system further comprises an electric motor and a controller converting an electrical current delivered by the first subset of cells into an electrical current delivered to the electric motor, the first cooling circuit being configured to furthermore cool the motor and the controller.

An aircraft is described which comprises a fuel cell system according to one of the above embodiments.

BRIEF DESCRIPTION OF THE DRAWINGS

The abovementioned features of the invention, together with others, will become more clearly apparent from reading the following description of one exemplary embodiment, the description being given with reference to the attached drawings, among which.

DETAILED DESCRIPTION OF THE PREFERRED EMBODIMENTS

Figure 1:
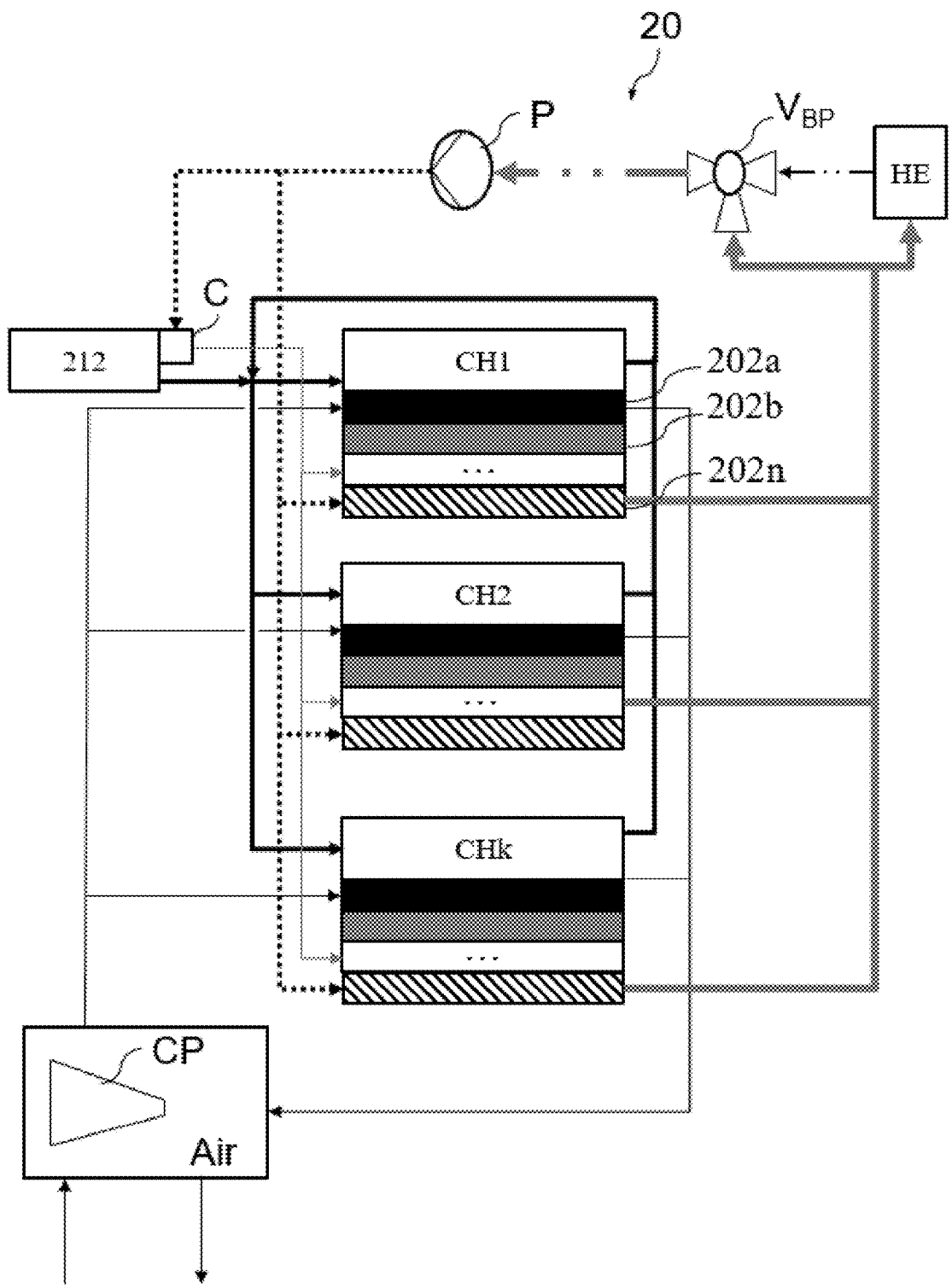
FIG. 1 is a schematic depiction of a system comprising a plurality of fuel cells according to one particular embodiment.

FIG. 1 is a schematic depiction of a system 20 comprising a plurality of fuel cells. The system illustrated in FIG. 1 may be used to supply electricity to an aircraft propulsion system. It may be used for purposes other than propulsion, e.g., for the lighting and/or ventilation of a passenger cabin, for supplying electrical power to flight warning systems, etc. In FIG. 1, the system 20 comprises a set of fuel cells which are distributed among k subsets CH1, CH2 . . . CHk of n cells each, k and n being integers. The k subsets CH1, CH2 . . . CHk are placed in parallel. For each subset, the n cells can be identified in FIG. 1 by a black rectangle (202a), by a grey rectangle (202b), . . . and by a diagonally hatched rectangle (202n). The system 20 comprises a number n of fuel cells that is greater than or equal to two. According to one particular embodiment, the set of cells is coupled to an electric motor powered by the electricity produced by the cells and to a controller of the electric motor, neither of which are depicted in FIG. 1. According to a variant, each subset of cells CHx (x=1, 2, . . . , k) is coupled to an electric motor powered with the electricity produced by the cells of the subset of cells CHx via a controller of the electric motor.

The fuel cells 202a, 202b, . . . , 202n are cells in which an electrical voltage is generated by the oxidation of a reducing fuel, in this instance dihydrogen, on an anode, coupled with the reduction of an oxidant, in this instance the dihydrogen in the air, on a cathode. The two electrodes are in contact with a membrane, which acts as an electrolyte, thus transporting the ions produced at the anode. Specifically, the oxidation of the dihydrogen at the anode produces H+ ions and electrodes e– which pass from the anode to the cathode. On arrival at the anode, the dihydrogen (H2) splits (oxidation) into H+ ions and electrodes according to the following reaction: 2H2=4H++4e–. The H+ ions migrate into the membrane as the electrons pass around an external circuit, thus producing electrical energy. At the cathode, the H+ ions, the electrodes e– and dihydrogen (e.g. coming from the air) meet to form water according to the following reaction: 4H++4e–+O2=2H2O. During this reaction, heat is released.

Hereinafter, the terms oxygen and dioxygen are used interchangeably. Likewise, the terms hydrogen and dihydrogen are used interchangeably.

The fuel cells are supplied with oxygen by an air circuit depicted in solid fine black line. The oxygen comes for example from the ambient air which is pressurized by at least one compressor CP, the compressed air being used to supply the subsets of cells CH1, CH2 . . . CHk. According to one particular embodiment, just one single compressor is used to supply all the subsets of cells with oxygen. The ambient air comes for example from one or more scoops. Oxygen not used by the fuel cells in the chemical reaction is discharged to outside the aircraft.

The fuel cells are also supplied with hydrogen via a hydrogen circuit depicted in thick solid black line. The hydrogen is stored, for example, in liquid form in a tank 212. The liquid hydrogen is vaporized by means of a capsule C which is in contact with the tank 212. The capsule is a hermetically sealed chamber in which a vacuum prevails that allows the pressure and temperature of the hydrogen in the hydrogen circuit to be regulated. Hydrogen not used by the fuel cells in the chemical reaction is returned to the hydrogen circuit. Without leaving the scope of the invention, the hydrogen may also be stored in gaseous form in the tank.

The fuel cells are cooled by a cooling circuit. Specifically, the chemical reactions in the fuel cells produce heat which needs to be removed in order not to overheat the cells. For this purpose, they are supplied with liquid coolant at a first temperature (dotted black line) and with liquid coolant at a second temperature (fine solid grey line) lower than the first temperature. The liquid coolant is, for example, a mixture of water and of glycol, e.g., of the EGW (Ethylene Glycol Water) type. In the event that the system 20 comprises several subsets of cells placed in parallel as illustrated in FIG. 1, the outlets of the cooling circuits of the various subsets of cells are combined. These outlets are connected to the inlet of a heat exchanger HE so as to remove heat to outside the installation. They are also connected to the inlet of a bypass valve VBP (valve bypass). Thus, part of the liquid coolant is sent to the inlet of the heat exchanger HE and another part is sent directly to the valve VBP. The heat exchanger HE is supplied with fresh air from outside by one or more scoops on the exterior skin of the aircraft. The scoops may be distributed over the perimeter of the exterior skin and may for example be of the NACA type or of a type that lies flush with the exterior skin. By virtue of the fresh air passing through the heat exchanger HE, the liquid coolant coming from the fuel cells and circulating through the heat exchanger HE is cooled, while the fresh air is warmed. The heat exchanger HE therefore discharges the hot air to outside the aircraft, for example via a jet pipe.

According to one embodiment, the heat exchanger HE is positioned in a ram air duct of the aircraft. According to one particular embodiment, the heat exchanger HE is common to all the subsets of cells.

An outlet of the heat exchanger HE is connected to the inlet of the bypass valve VBP so as to send liquid coolant cooled by the heat exchanger HE into the cooling circuit. The bypass valve VBP is used to regulate the temperature at the inlet to the fuel cells. This valve VBP effectively makes it possible to vary the quantity of liquid coolant coming from the heat exchanger HE and sent into a cooling circuit. The valve VBP is therefore connected to a computer which, on the basis of measurements of the temperature of the liquid coolant at the inlet to the subset of cells, operates the valve and instructs it to increase or decrease the quantity of liquid coming from the heat exchanger HE on the basis of a target temperature, e.g., equal to a value slightly higher than 80° C. For that purpose, a temperature probe located downstream of the valve VBP is used to create a closed control loop for operating the valve. Specifically, at high altitude, the exterior temperatures may be very low. This is why only part of the liquid is cooled using the heat exchanger HE, and a hotter part is sent directly to the valve VBP. The liquid coolant leaving the valve VBP is used notably to vaporize the liquid hydrogen stored in the tank 212 by entering the capsule C. It must not therefore be excessively cold.

The outlet from the bypass valve VBP is connected to the inlet of a pump P. The pump P is configured to cause the liquid coolant to circulate through the various elements (e.g., fuel cells, motor 204 and controller 208). The pump P is used to regulate the temperature at the outlet of the fuel cells by varying the flow rate of liquid coolant (hot and cold) sent to the inlet of the fuel cells. The allocation of the total cooling flow rate between the valve VBP and the heat exchanger HE is controlled by the pump P and depends on the pressure drops generated by these members.

In a particular embodiment, all the subsets of cells operate to produce the same power, their outlet valves Vout (represented in FIG. 2) are then opened to the maximum. The pump P is controlled by the computer which indicates to it the flow rate of liquid coolant to be sent to the inlet of the fuel cells as a function of the cooling needs of the cells. Increasing the liquid coolant flow rate makes it possible to better discharge the heat produced by the cells and to reduce the temperature of the liquid coolant at the outlet of the cells.

In another particular embodiment, the power demands are different between the subsets of cells, and consequently their cooling needs. In this embodiment, the pump P is servocontrolled by the subset of cells CHM (out of CH1, CH2 . . . CHk) having the greatest need to be cooled. To this end, the pump P is controlled by the computer which indicates to it the flow rate of liquid coolant to be sent to the inlet of the fuel cells as a function of the demand, i.e., of the cooling needs, of the subset of cells CHM. The subset of cells CHM then has its own valve at the outlet Vout opened to the maximum. The valves Vout of the other subsets of cells are then slightly closed. Indeed, the latter have less need to be cooled.

The valve VBP and the pump P therefore allow a global temperature regulation, i.e. one that is common to all the subsets of cells. More specifically, the overall temperature regulation allows for a primary regulation of the temperature at the inlet and at the outlet of each subset of cells.

The outlet of the pump P is connected to an inlet E1 of each of the subsets of cells CH1, CH2 . . . CHk. It is also connected to the inlet of the capsule C the outlet of which is connected to another inlet E2 of each of the subsets of cells CH1, CH2 . . . CHk. Thus, part of the liquid coolant leaving the pump P is sent directly to the inlet E1 of the subsets of cells and corresponds to a liquid referred to as hot. Another part of the liquid coolant passes through the capsule C. The liquid coolant passing through the capsule C is used to vaporize the hydrogen stored in the tank 212. The liquid coolant leaving the capsule C is therefore colder than that entering it. It is sent to the second inlet E2 of the subsets of cells and corresponds to a liquid referred to as cold.

Figure 2:
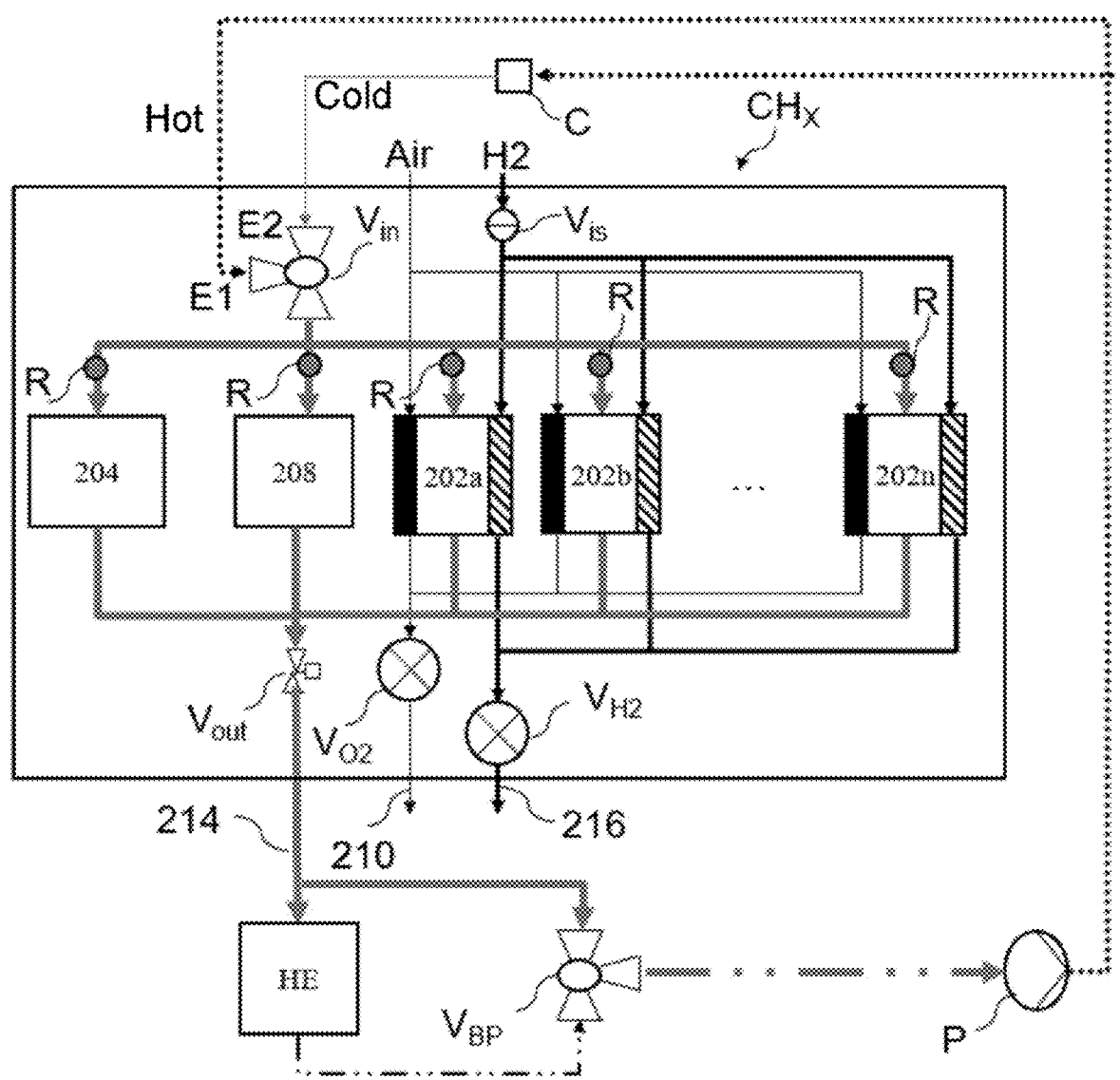
FIG. 2 is a schematic depiction of a set of fuel cells according to one particular embodiment.

FIG. 2 is a schematic depiction of one of the subsets of cells CHx, x=1, 2 . . . k of FIG. 1. In FIG. 2, the subset of cells CHx comprises n fuel cells. The subset of cells CHx comprises at least two fuel cells. In FIG. 2, the n fuel cells are coupled to an electric motor 204 supplied with electricity by the fuel cells of the subset of cells CHx and to a controller 208. According to one embodiment, the controller 208 comprises an electric converter which converts a direct electric current delivered by the fuel cells into a direct or alternating electric current delivered to the electric motor 204. The conversion to direct or alternating electric current is dependent on the type of electric motor used. In a variant, the motor 204 and the controller 208 are external to the subset of cells CHx. In another variant, the electricity produced by the fuel cells is used to power an element other than the motor 204, e.g., the lighting of a passenger cabin.

In FIG. 2, the air circuit 210, hydrogen circuit 216 and cooling circuit 214 have been depicted using the same line styles as in FIG. 1.

Valves VO2 and VH2 are positioned at the outlet of the air circuit 210 and hydrogen circuit 216. These valves make it possible to control the flows of air and, respectively, of hydrogen, passing through the cells. They are controlled by a computer. Specifically, according to the electrical power demanded of the subset of cells CHx, a certain quantity (mass flow) of hydrogen and a certain quantity of oxygen need to be supplied to the cells. These quantities are determined by the computer, taking account of the chemical reactions that take place at the anode and at the cathode and of the stoichiometric quantities of the air and hydrogen products participating in the reaction. The demands for electrical power may be different from one subset of cells to another, hence the benefit of controlling the quantities of hydrogen and of oxygen, subset of cells by subset of cells, using the valves VO2 and VH2.

A fuel cell, in addition to generating an electrical voltage, produces heat that needs to be removed. For this purpose, the subset of cells CHx comprises a cooling circuit depicted in thick grey solid line. The cooling circuit comprises a first inlet E1 at which the liquid coolant arrives at the first temperature (referred to as hot liquid) and a second inlet E2 at which the liquid coolant arrives at the second temperature (referred to as cold liquid), the second temperature being lower than the first temperature. The cooling circuit comprises a device Vin configured to mix the hot liquid and the cold liquid in order to obtain the liquid coolant at a target temperature. To do that, the temperature at the outlet of the device Vin may be measured and transmitted to a computer (not depicted in FIG. 2). On the basis of a discrepancy between the measured temperature value and a setpoint value, the computer will operate the device Vin. The setpoint value is equal, for example, to 80° C. Thus, if the measured temperature is higher than the setpoint temperature, then the computer instructs the device Vin to increase the quantity of cold liquid in the mixture until the setpoint temperature is reached. On the other hand, if the measured temperature is lower than the setpoint temperature, then the computer instructs the device Vin to increase the quantity of hot liquid in the mixture. The liquid coolant thus obtained is then distributed between the various elements it has to feed, e.g. the various cells and, where appropriate, the motor 204 and the controller 208.

To this end, the cooling circuit comprises a liquid coolant restrictor R, which is a vacuum-generating element, at the inlet of each element (i.e., the different cells and, if appropriate, the motor 204 and the controller 208) that it supplies with liquid coolant. A concentric diaphragm is for example such a liquid coolant restrictor R. This diaphragm can be inserted between the flanges of two lines. In a variant, the diaphragm is directly incorporated inside a line. These restrictors R make it possible to allocate the quantity of liquid coolant between the different elements, notably between the different cells. According to one embodiment, the restrictors R are configured to allocate the liquid coolant between the cells according to their respective cooling needs which can be different. In the case where the electrical charge is equally distributed over the cells, the restrictors R are configured so that the same quantity of liquid coolant arrives at the inlet of each of the cells. Indeed, in this particular case, the cells generally dissipate the same quantity of heat outward and therefore have identical cooling needs. The restrictors R are notably designed by taking account of the quantity of heat dissipated which can be different on each cell, of the line used upstream and downstream of the cells, and of the position of the cells in the subset of cells. The restrictors R are designed according to the geometry (length, number and nature of elbows) of the piping upstream and downstream of the cell. For example, in instances in which the restrictor R is an orifice plate, the shorter and less burdened with "obstacles" the line between the upstream and downstream junction points, the smaller will be the inside diameter of the established orifice in order to generate a higher pressure drop to compensate for the small pressure drop induced by the piping. The liquid coolant leaving the various elements (i.e., at the outlet of the various cells and, where appropriate, of the motor 204 and of the controller 208) is therefore hotter than at the inlet to these elements. In order to regulate the temperature at the outlet of the subset of cells CHx, the cooling circuit comprises an outlet valve Vout, which is controlled by a computer to regulate the temperature of the liquid coolant at the outlet of the subset of cells CHx. When the temperature measured at the outlet increases, the computer sends an instruction to the outlet valve Vout to make it increase its degree of opening in order to increase the flow rate of the liquid coolant and thus obtain better temperature regulation.

Such a cooling circuit (comprising Vin, R and V out) makes it possible to finely regulate the temperature and therefore the cooling of the different elements. It notably makes it possible to regulate the temperature, for each subset of cells. This fine regulation of the temperature can be coupled with the primary regulation described with reference to FIG. 1 or else be used without the primary regulation. The use of the primary regulation of the temperature described with reference to FIG. 1 makes it possible to improve the fine regulation of the temperature at each subset of cells.

According to one embodiment, the cooling circuit (comprising Vin, R and Vout) illustrated in FIG. 2 is common to at least two fuel cells of the plurality of fuel cells. According to a particular embodiment, the cooling circuit is common to all the fuel cells of one and the same subset of cells. In this case, the cooling circuit is reproduced for each subset CHx of fuel cells. According to a variant, the cooling circuit is common to all the fuel cells of all the subsets CHx of fuel cells.

According to another variant, the cooling circuit is also used to cool the electric motor 204 and the controller 208 as illustrated in FIG. 2. In a variant, a first cooling circuit, as previously presented, ensures the cooling of the fuel cells and a second cooling circuit distinct from the first cooling circuit ensures the cooling of the motor 204 and of the controller 208.

Having a single cooling circuit used to cool a plurality of fuel cells allows for a saving of space, a reduction of the weight of the system, a manufacturing cost saving because there is less equipment to be bought. Moreover, having a single cooling circuit also makes it possible to reduce the complexity of the system. Its maintenance is therefore simplified for the airlines. The computers that control the system are less expensive because of the reduction in the number of inputs (sensors) and outputs (valves and pumps) they have to manage.

Note that the subset of cells CHx may comprise other elements, not depicted in FIG. 2. As an option, the subset of cells CHx may comprise an isolation valve Vis at the inlet of the hydrogen circuit. The isolation valve Vis allows the subset of cells CHx to be isolated from the other subsets of cells, notably in the event of a hydrogen leak. The subset of cells CHx can also comprise a module (not depicted in FIG. 2) for measuring the differential pressure between the air intake and the hydrogen intake in order to control and, where appropriate, to limit, the difference in pressure between the two gasses across the membrane.

The one same single computer can be used to operate all of the valves and the pump. In a variant, different computers are used.

The subsets of fuel cells in FIGS. 1 and 2 are advantageously coupled with an electrical-energy storage system comprising batteries and/or capacitors.

The subsets of fuel cells in FIGS. 1 and 2 are advantageously used by an aircraft propulsion system.

Figure 3:
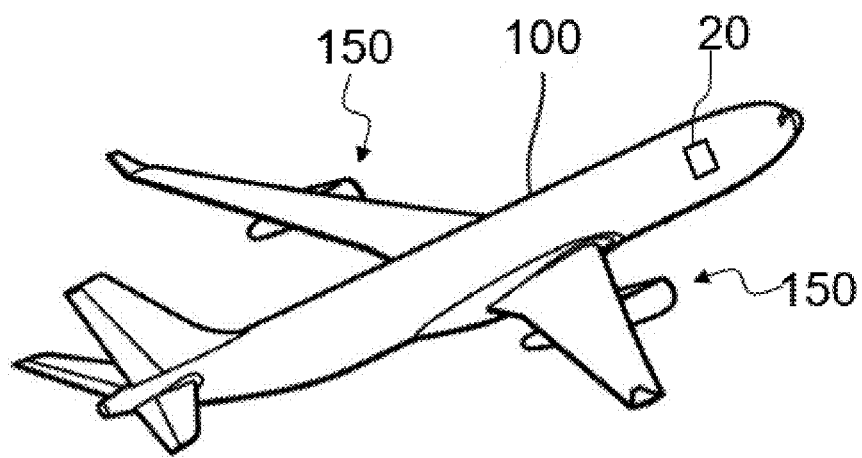
FIG. 3 is a perspective view of an aircraft according to one particular embodiment.

FIG. 3 is a perspective view of an aircraft 100 which has a fuselage on each side of which a wing is attached. Attached beneath each wing is at least one propulsion system 150. In FIG. 3, the propulsion systems 150 are placed beneath the wing, but in another embodiment, they may be on top of the wing. The aircraft comprises at least one system 20 as abovementioned, comprising a plurality of fuel cells. According to a first embodiment, this system 20 is used to supply electricity to an aircraft propulsion system 150. According to a second embodiment, the system 20 is used to electrically power non-propulsive systems of the aircraft (for example: computers, actuators, electrical converters, etc.).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system of fuel cells for an aircraft, comprising:
a plurality of fuel cells,
a hydrogen circuit and an air circuit which carry hydrogen and air, respectively, towards the fuel cells,
a first cooling circuit configured to cool a first subset of fuel cells of said plurality of fuel cells, said first subset comprising at least two fuel cells, said first cooling circuit comprising:
a device controlled by a computer configured to mix a first part of a liquid coolant at a first temperature and a second part of said liquid coolant at a second temperature lower than said first temperature so as to obtain a liquid coolant having a target temperature, an outlet of said device being connected to an inlet of said fuel cells of said first subset;
a liquid coolant restrictor at the inlet to each of said fuel cells of said first subset and configured to distribute said liquid coolant at the target temperature between said fuel cells of said first subset; and
an outlet valve connected to an outlet of said fuel cells of said first subset, the opening of said outlet valve being controlled by said computer as a function of the cooling needs of said fuel cells of said first subset,
a heat exchanger configured to cool a part of the liquid coolant leaving said first cooling circuit,
a bypass valve configured to mix a part of the liquid coolant leaving said first cooling circuit and said part of liquid coolant cooled by said heat exchanger, and
a pump connected to an outlet of said bypass valve, the pump being controlled by said computer to control a flow rate of liquid coolant circulating in said first cooling circuit so as to regulate a temperature of the liquid coolant at the outlet of the fuel cells of said first subset of fuel cells.

2. The system according to claim 1, which further comprises a storage tank of hydrogen in liquid form and a capsule in contact with said storage tank in which circulates a part of the liquid coolant leaving said pump, said capsule being configured to vaporize the liquid hydrogen from said part of the liquid coolant.

3. The system according to claim 1, comprising
a second cooling circuit configured to cool a second subset of fuel cells of said plurality of fuel cells, said second subset comprising at least two fuel cells, said second cooling circuit comprising:
a device controlled by a computer configured to mix a first part of a liquid coolant at a first temperature and a second part of said liquid coolant at a second temperature lower than said first temperature so as to obtain a liquid coolant having a target temperature, an outlet of said device being connected to an inlet of said fuel cells of said second subset;
a liquid coolant restrictor at the inlet to each of said fuel cells of said second subset and configured to distribute said liquid coolant at the target temperature between said fuel cells of said second subset; and an outlet valve connected to an outlet of said fuel cells of said second subset, the opening of said outlet valve being controlled by said computer as a function of the cooling needs of said fuel cells of said second subset, said second subset being distinct from said first subset.

4. The system according to claim 3, wherein said first and second cooling circuits are connected to said heat exchanger in parallel.

5. The system according to claim 3,
wherein said pump is configured to control a flow rate of liquid coolant circulating in said first and second cooling circuits, and
wherein said pump is servocontrolled by the cooling circuit out of said first and second cooling circuits associated with fuel cells of the plurality of fuels cells having a highest of cooling needs.

6. The system according to claim 1, wherein said first cooling circuit is configured to cool all of said plurality of fuel cells.

7. The system according to claim 1, further comprising an electric motor and a controller converting an electrical current delivered by said first subset of fuel cells into an electrical current delivered to the electric motor, said first cooling circuit being configured to furthermore cool said motor and said controller.

8. An aircraft comprising a system of fuel cells according to claim 1.

* * * * *